(No Model.)
H. EISNER.
FILTER.
No. 524,821. Patented Aug. 21, 1894.
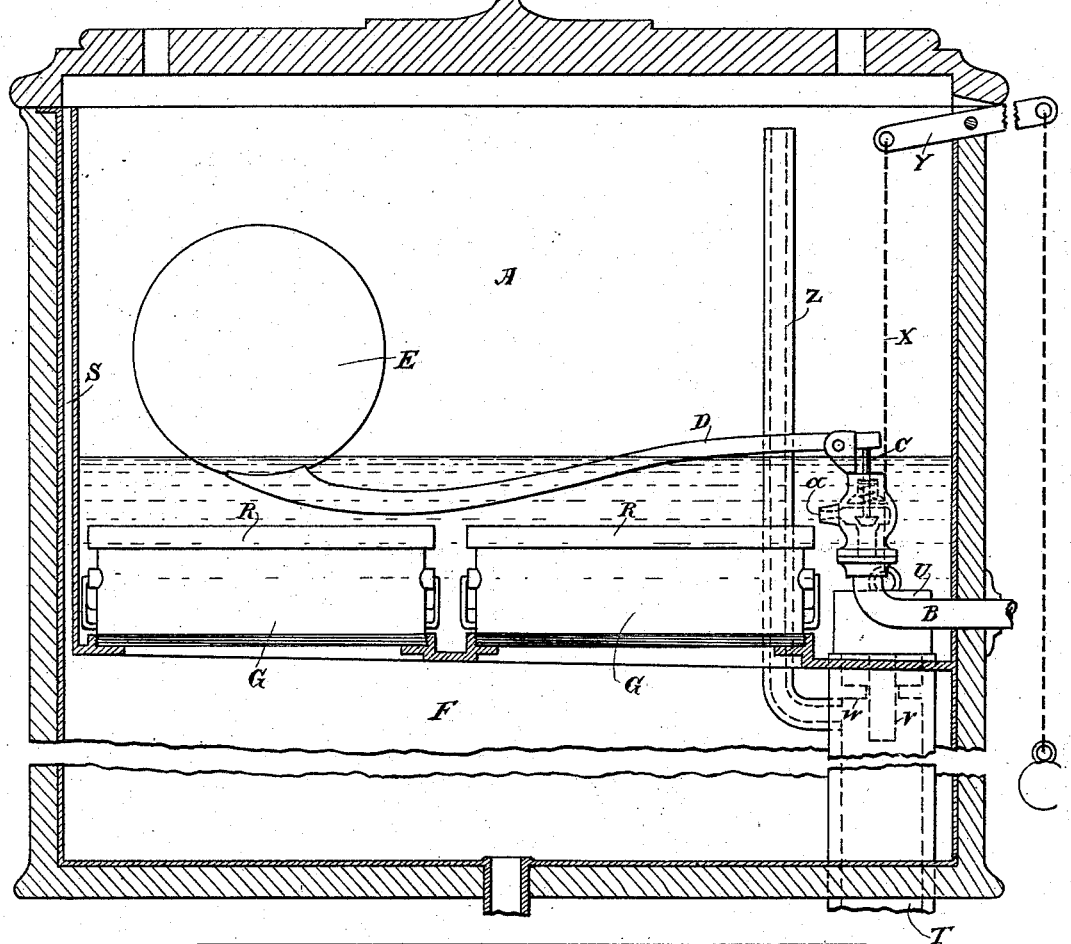
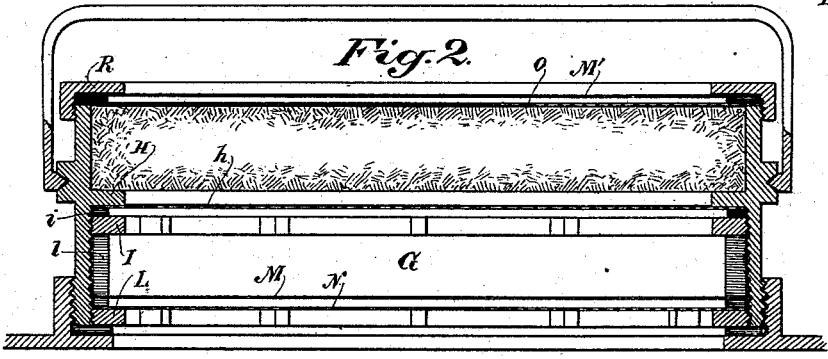
Witnesses:
B. A. Nourse
H. F. Ascheck
Inventor
Herman Eisner
By Dewey & Co.
Attys

UNITED STATES PATENT OFFICE.

HERMAN EISNER, OF SAN FRANCISCO, CALIFORNIA.

FILTER.

SPECIFICATION forming part of Letters Patent No. 524,821, dated August 21, 1894.

Application filed June 22, 1893. Serial No. 478,482. (No model.)

*To all whom it may concern:*

Be it known that I, HERMAN EISNER, a citizen of the United States, residing in the city and county of San Francisco, State of California, have invented an Improvement in Filters; and I hereby declare the following to be a full, clear, and exact description of the same.

My invention relates to certain improvements in filters, especially designed for filtering water for drinking and household purposes.

It consists of a compartment filter case having chambers for the reception of the unfiltered water, means for delivering it thereto and regulating the supply, devices through which the water is passed and filtered, and a reservoir to receive and contain the filtered water after passing the filters, a means by which the unfiltered water chamber and the surfaces of the filters may be periodically cleaned of any deposit within and upon them, and in certain details of construction which will be more fully explained by reference to the accompanying drawings, in which—

Figure 1 is a vertical section taken through the filtering apparatus. Fig. 2 is a section through one of the filters.

The object of my invention is to provide a filtering device, and a means whereby the unfiltered water chamber, and the surfaces of the filters may be periodically cleaned of any sediment or deposit which would ordinarily accumulate therein.

In carrying out my invention I employ two chambers one above the other, suitably lined to make them tight and keep the water in good condition.

The chamber A receives water through a pipe B which passes up along the side of the chamber and opens through one side at a point above the level of the filters to be hereinafter described.

The filter chambers may be placed in any suitable or desired position. I prefer to fix the filter upon the side of the wall of the room, or other point conveniently near, where it is to be used, and at a considerable height, so that the water may be drawn from the lower chamber or reservoir by means of pipe and cock so as to deliver it at any desired point.

The supply pipe extending up the wall delivers into the filter as before described, and the inner end is provided with a valve of any usual or well known pattern. In the present case, I have shown a valve which normally remains open, having a stem C projecting through the top of the valve chamber. A lever D is fulcrumed to a support just in front of the stem, so that the short arm of the lever stands above the stem C.

E is a float fixed to the long arm of the lever, and when the float is down and a chamber empty, water will flow in through the supply pipe until the float is raised so that the inner end of the lever arm will press upon the valve stem and close the valve, when the supply will cease until such time as the water in the chamber has become lowered sufficiently to allow the valve to again open. One or more filters are fixed in the bottom of this chamber and between it and the filtered water reservoir F, which is situated below it. In the present case I have shown the filters as consisting of removable cylindrical chambers G, the lower ends of which are screw-threaded and adapted to fit corresponding screw-threads in the openings in the bottom of the unfiltered water chamber. These filters are composed of screens of peculiar construction and material, and an interposed filling of pulverized charcoal.

The arrangement is as follows:—The interior of the cylindrical chamber is screw-threaded from the bottom to a point about midway of the depth of the chamber. At this point is an inwardly projecting annular flange H. Against the bottom of this flange is fitted a disk of fine wire gauze *h* which is secured in place by means of a screw-threaded ring I which fits the threads in the interior of the chamber, and is provided with short arms by which it can be turned into place. An annular rubber gasket *i* is placed against the bottom of the wire cloth and the ring I is then screwed into place so as to press the rubber ring against the edge of the disk of wire cloth and clamp it firmly between the annular flange and the screw ring. Beneath the screw ring are then placed one or more rubber rings *l*, and against these fits a disk M made of cloth formed of fine strands of whalebone woven together, forming what is known as haircloth. Exterior to this haircloth disk is placed a disk of wire gauze N, and outside of all is fitted another screw ring L which is screwed down upon the wire gauze, thus holding it firmly in place. Above the wire gauze or cloth which is secured against the internal flange H of the chamber, is placed a mass of pulverized charcoal or other filtering material filling the upper portion of the chamber to near the top. Above this is placed another circular disk of wire cloth or gauze O, and on top of this is finally placed a cover M' made of the before described whalebone fiber or haircloth. This haircloth and gauze at the top are held in place by the final ring R which screws upon the top of the chamber and closes it and holds the haircloth and gauze in position above the filtering material.

As many of these filters may be employed as desired. In the present case I have shown two fitted to screw or be otherwise removably secured into the bottom of the upper or unfiltered water chamber. The water delivered into the upper chamber passes gradually through these filters and is delivered into the lower chamber in a condition fit for use, from which it may be drawn as before stated by suitable pipe and cock. A passage S is made in one corner or side of the chamber leading from the lower chamber up to the open air to admit air for the aeration of the water below. The bottom of the upper chamber is made slightly inclined so as to be a little lower upon one end than the other. From this lower end, a pipe T extends down through the bottom of the filtered water chamber having no connection with said chamber, and being connected with suitable discharge pipe or passage below the structure. The upper end of this pipe opens into the bottom of the unfiltered water chamber, and is closed by means of a weighted valve U having a guide stem V passing through a suitable cross or guide W fixed in the pipe so that the valve may rise and fall evenly.

Z is an overflow pipe which acts in case the ball valve fails to work properly.

The valve U is connected by a chain X with a lever arm Y which is fulcrumed upon the upper edge of the unfiltered water chamber, one arm projecting inwardly and being connected by a chain with the valve, while the other arm extends outwardly, and has a chain or cord connected with it, and extending down alongside the water supply pipe through suitable guide loops to a point where it is within easy reach of the operator.

Whenever it is desired to cleanse the unfiltered water tank, it is done by pulling upon this cord or chain, and thus opening the valve and allowing the water in the upper chamber to flow out freely through the discharge pipe which is of large diameter so that the water in the tank will sweep out any sediment which may have collected therein, the inclination of the bottom assisting in this operation. As soon as the water in the upper chamber begins to be lowered by the discharge, the ball valve will be opened, and a jet of water will be discharged across the chamber, the passage a being so disposed that the jet will strike the upper surfaces of the haircloth which forms the top of the filter, and thus any material or sediment which has been deposited thereon will be immediately washed off and carried out through the discharge. This packing material is of importance in the construction of my filter, because by reason of the whalebone used in its construction, it has a hard glassy surface into which the sediment does not penetrate, and within which it is not retained as in the case of asbestos or other fibrous material usually employed in filters. For this reason, the sediment can be instantly washed off the surface. For the same reason, the finer sediment which passes through the charcoal filter below, and any material which may be carried from the charcoal will be retained by and can be washed off the lower whalebone disk and prevented from passing off with the filtered water.

Having thus described my invention, what I claim as new, and desire to secure by Letters Patent, is—

1. In a filter, the filtered and unfiltered water chambers disposed one above the other, openings made from the unfiltered water chamber to the reservoir below, filters removably fixed in said openings, consisting of cylindrical chambers having wire gauze and haircloth disks fixed therein and an interposed packing of pulverized charcoal as shown, in combination with supply and discharge pipes, a supply controlling valve and a float by the movements of which it is opened and closed, a passage through which water is delivered from the supply pipe across the upper surfaces of the filters, substantially as herein described.

2. In a filter, a lower chamber adapted to contain filtered water, a chamber above into which the unfiltered water is delivered, said chamber having a bottom inclined from one side to the other, a discharge passage at the lower side with closing plug and a chain and lever by which it is opened, a supply pipe, with valve and float, and lever by which it is actuated, and filters removably fitted into openings in the bottom of the upper chamber having haircloth disks in the upper surfaces, and a jet tube a so disposed with relation to said disks that water will be discharged across them when the supply valve is opened, substantially as herein described.

In witness whereof I have hereunto set my hand.

HERMAN EISNER.

Witnesses:
S. H. NOURSE,
J. A. BAYLESS.